US008678601B2

(12) United States Patent
Morris et al.

(10) Patent No.: US 8,678,601 B2
(45) Date of Patent: Mar. 25, 2014

(54) COLLAPSIBLE LIGHT MODIFIER FOR PORTABLE FLASH

(76) Inventors: Robert Lee Morris, Charleston, SC (US); Patrick Haskell Hall, Charleston, SC (US)

(*) Notice: Subject to any disclaimer, the term of this patent is extended or adjusted under 35 U.S.C. 154(b) by 16 days.

(21) Appl. No.: 13/373,568

(22) Filed: Nov. 18, 2011

(65) Prior Publication Data

US 2013/0128491 A1 May 23, 2013

(51) Int. Cl.
*G03B 15/02* (2006.01)
*F21V 1/06* (2006.01)
*F21V 11/00* (2006.01)

(52) U.S. Cl.
USPC ............................. 362/17; 362/352; 362/355

(58) Field of Classification Search
USPC ................... 362/3, 16–18, 352; 396/198, 200
See application file for complete search history.

(56) References Cited

U.S. PATENT DOCUMENTS

| | | | |
|---|---|---|---|
| 5,154,503 A | 10/1992 | Sternsher | |
| 5,311,409 A * | 5/1994 | King | 362/17 |
| D357,492 S | 4/1995 | Henry | |
| 5,778,264 A * | 7/1998 | Kean | 396/174 |
| 6,076,935 A | 6/2000 | Kester | |
| 6,513,955 B1 | 2/2003 | Waltz | |
| 6,733,145 B2 | 5/2004 | Shirilla | |
| 7,253,921 B2 * | 8/2007 | Beisch et al. | 358/1.9 |
| 7,360,909 B1 * | 4/2008 | Hughes | 362/18 |
| 7,748,875 B2 * | 7/2010 | Fong | 362/355 |
| 7,885,526 B2 | 2/2011 | Henry | |
| D641,100 S | 7/2011 | Li | |
| 7,978,971 B1 * | 7/2011 | Honl | 396/198 |
| 8,014,654 B2 | 9/2011 | Karle | |
| 8,201,955 B2 * | 6/2012 | Fong | 362/18 |
| 2007/0189756 A1 * | 8/2007 | Henry | 396/213 |
| 2009/0269045 A1 * | 10/2009 | Astill | 396/3 |
| 2010/0182793 A1 * | 7/2010 | Geller | 362/341 |

OTHER PUBLICATIONS www.nikonusa.com/Nikon-Products/Product-Archive/Flashes/4801/SB-800-AF-Speedlight.html.
www.amazon.com/Lastolite-LL-LB8867-Hilite-Background/dp/B000VWTC9W.

* cited by examiner

*Primary Examiner* — Jong-Suk (James) Lee
*Assistant Examiner* — Alexander Garlen (57) ABSTRACT

A one-piece, collapsible light modifier device for attachment to a flash mechanism, including: (a) a translucent front panel; (b) a reflective rear panel that is substantially the same shape as the front panel, the rear and front panels each including a bendable wire frame around its periphery; (c) at least one side panel between the front panel and the rear panel; (d) a flash hole at a base of the light modifier device between opposite ends of the side panel; and (e) a flash strap attached to the reflective inside surface of the rear panel adjacent the flash hole; wherein the light modifier device includes a compact, closed position and an open position for use. This simplified abstract is not intended to limit, and should not be interpreted as limiting, the scope of the claims.

19 Claims, 13 Drawing Sheets

COLLAPSIBLE LIGHT MODIFIER FOR PORTABLE FLASH

BACKGROUND OF THE INVENTION

1. Technical Field

The present invention relates to a collapsible, portable light modifier for detachable attachment to a camera flash mechanism for use in still photography or videography.

2. Background Information

A light box, or softbox, helps diffuse light and light small objects evenly, such as flowers, insects, and food items, without glare or shadows. One can buy or build a softbox, but the conventional large softboxes currently available or buildable are inconvenient and cumbersome to transport, especially in light of all the materials an on-site photographer, such as a wedding photographer, already has to carry. Large softboxes (e.g., six feet tall) for use in the studio as highkey backgrounds, or backdrops, take up space and are also cumbersome.

BRIEF SUMMARY OF THE INVENTION

The present invention is a one-piece, collapsible light modifier device for portable photography flash mechanism or the like, comprising: (a) a translucent front panel comprising a bendable wire frame around its periphery; (b) a reflective rear panel comprising a reflective inside surface, the rear panel being substantially the same shape as the front panel, the rear panel comprising a bendable wire frame around its periphery; (c) at least one side panel attached between the front panel and rear panel adjacent a periphery of the front and rear panels; (d) a flash hole at the base of the light modifier device between opposite ends of the side panel, and between the front panel and the rear panel; and (e) a flash strap attached to the reflective inside surface of the rear panel adjacent the flash hole. The light modifier device is foldable into a closed position for transport and storage, and has a pop-up open position for use. A light modifier device with hook and loop strips is also included herein.

Advantages of the collapsible light modifier of the present invention include the following: 1) very easy to attach to a flash mechanism, and detach from the flash mechanism for storage in a pouch or with a strap; 2) foldable and compact for transport and storage; fits in a pocket or purse; 3) pops open upon removal from its storage pouch; 4) the lightweight light modifier on the flash mechanism can be hand-held or placed on a tripod or lightstand; 5) channels light from the flash straight up, avoiding glare or hot spots; and 6) can be used for lighting videos and still photography, such as macro (small objects) photography.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

In the following description, like reference characters designate like or corresponding parts throughout the several views. Also, in the following description, it is to be understood that such terms as "front," "rear," "within," and the like are words of convenience and are not to be construed as limiting terms. Referring in more detail to the drawings, a device embodying the principles and concepts of the present invention and generally designated by the reference numeral 10 will now be described.

Turning first to FIGS. 1 through 4, a one-piece, collapsible light modifier device 10 for detachable attachment to a flash mechanism 20 or the like comprises: (a) a translucent front panel 11 comprising a bendable wire frame 17 around its periphery; (b) a reflective rear panel 12 comprising a reflective inside surface 13, the rear panel 12 being substantially the same shape as the front panel 11, the rear panel comprising a bendable wire frame 17 around its periphery; (c) at least one side panel 18 between the front panel 11 and the rear panel 12, adjacent a periphery of the front panel 11 and a periphery of the rear panel 12; (d) a flash hole 15 at the base of the light modifier device 10 between opposite ends 36 of the side panel 18, and between the front panel 11 and the rear panel 12; and (e) a flash strap 16 attached to the reflective inside surface 13 of the rear panel 12 adjacent the flash hole 15.

Figure 6:
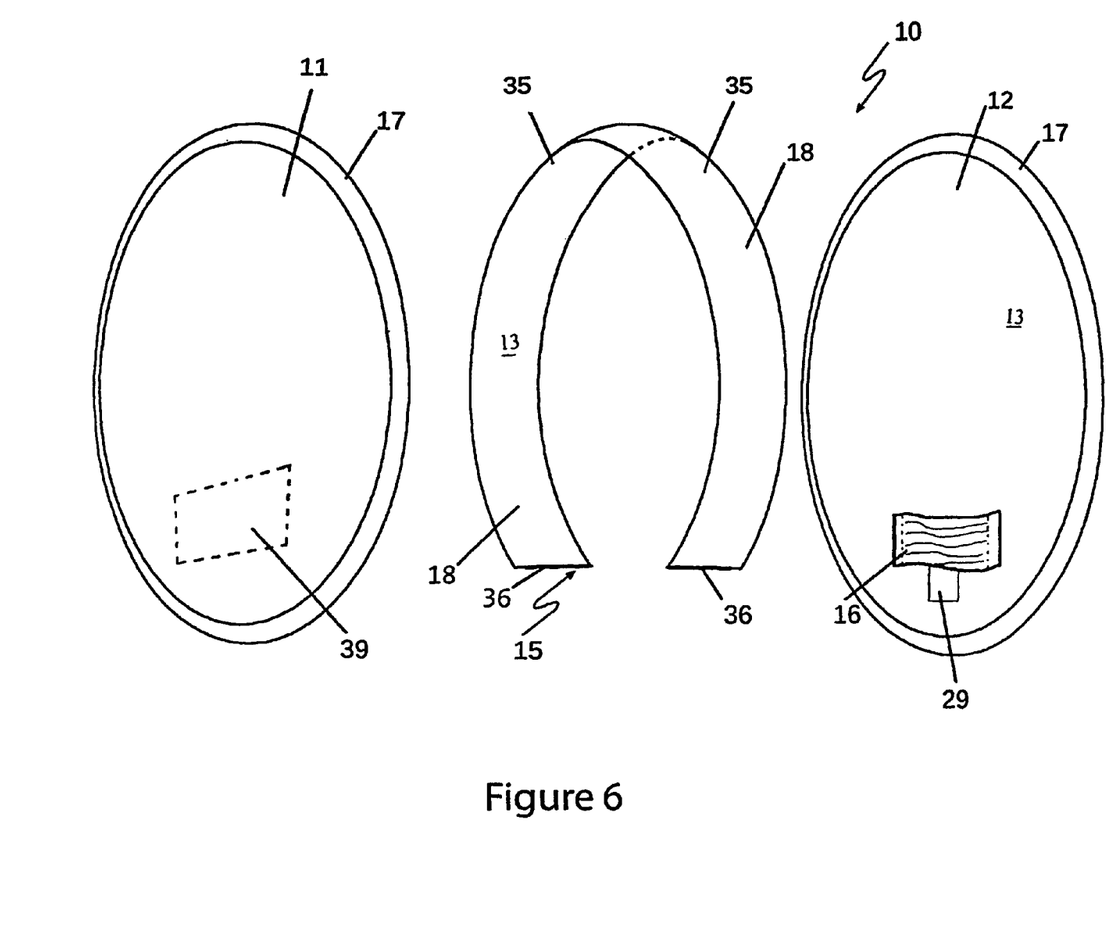
FIG. 6 is an exploded view of a light modifier device according to the present invention.
Figure 7:
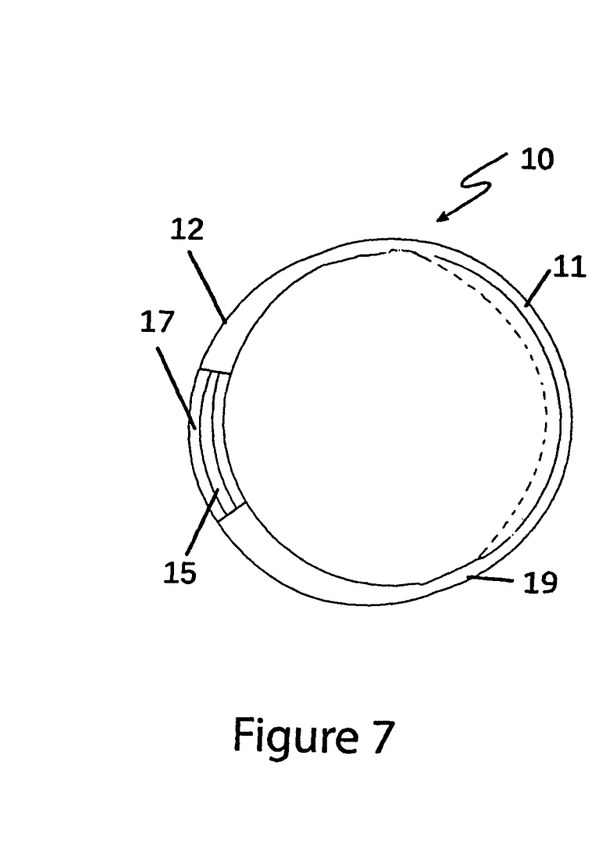
FIGS. 7-9 show front perspective views of a light modifier device according to the present invention, shown unfolded/open (FIG. 7), partially folded (FIG. 8), and folded/closed (FIG. 9)
Figure 9:
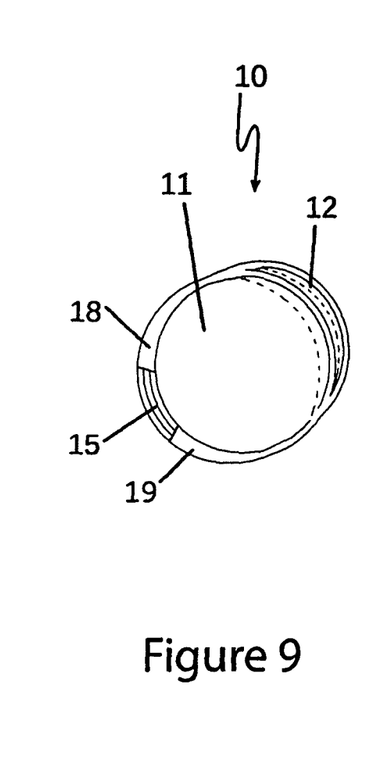
Figure 10:
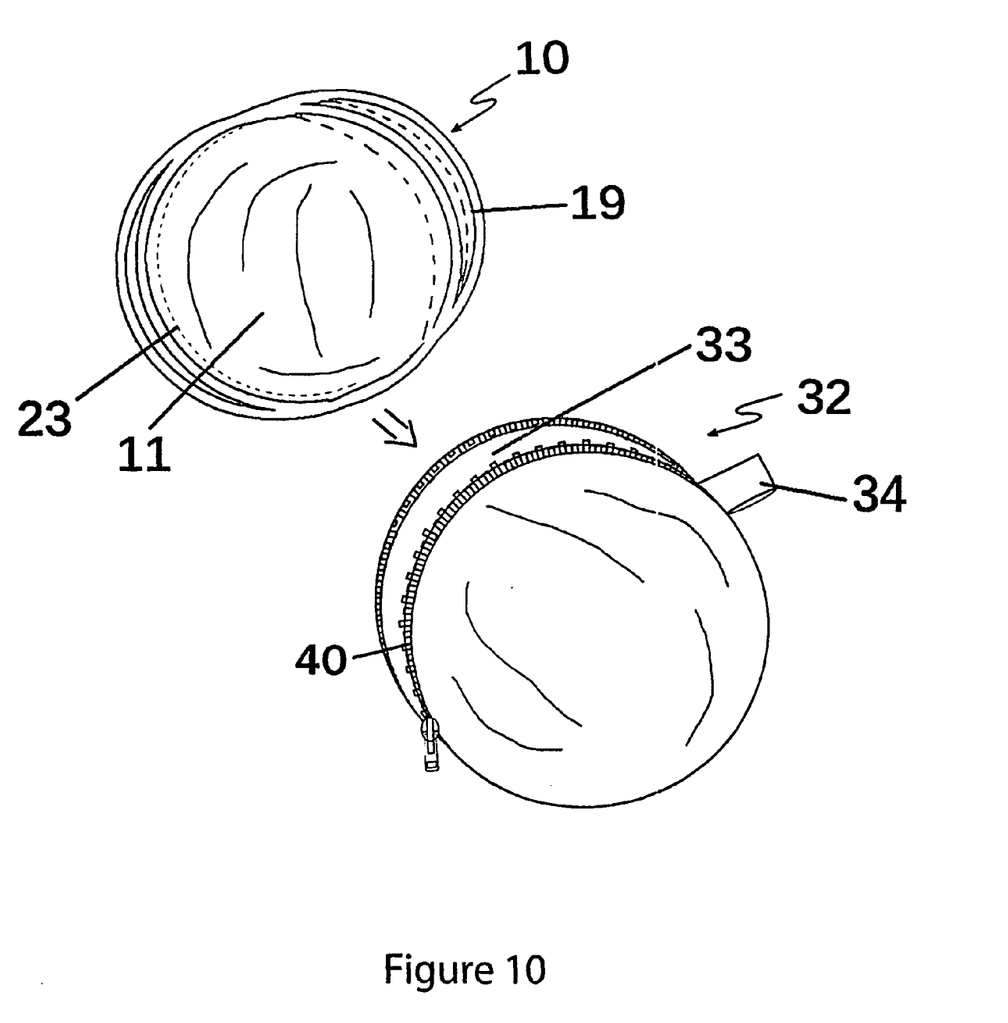
FIG. 10 is a perspective view of a folded light modifier device according to the present invention, shown with an open storage pouch.

The light modifier device 10, or light box, is foldable, or collapsible, into a closed position for transport and storage, as seen in FIGS. 9 and 10, and also has a pop-up, open position ready for use, as seen in FIGS. 6 and 7. Whether it is in open or closed, the lightweight light modifier device 10 can be held in one hand ("hand-held"), leaving the other hand free. The light modifier device 10 is attachable to a portable light source, such as a conventional flash mechanism 20. Once the flash 21 is strapped into the light modifier device 10, the light modifier device 10 is hands-free. The light modifier device 10 is perched on the flash mechanism 20 somewhat like a lamp shade and need not be held by hand.

Figure 1:
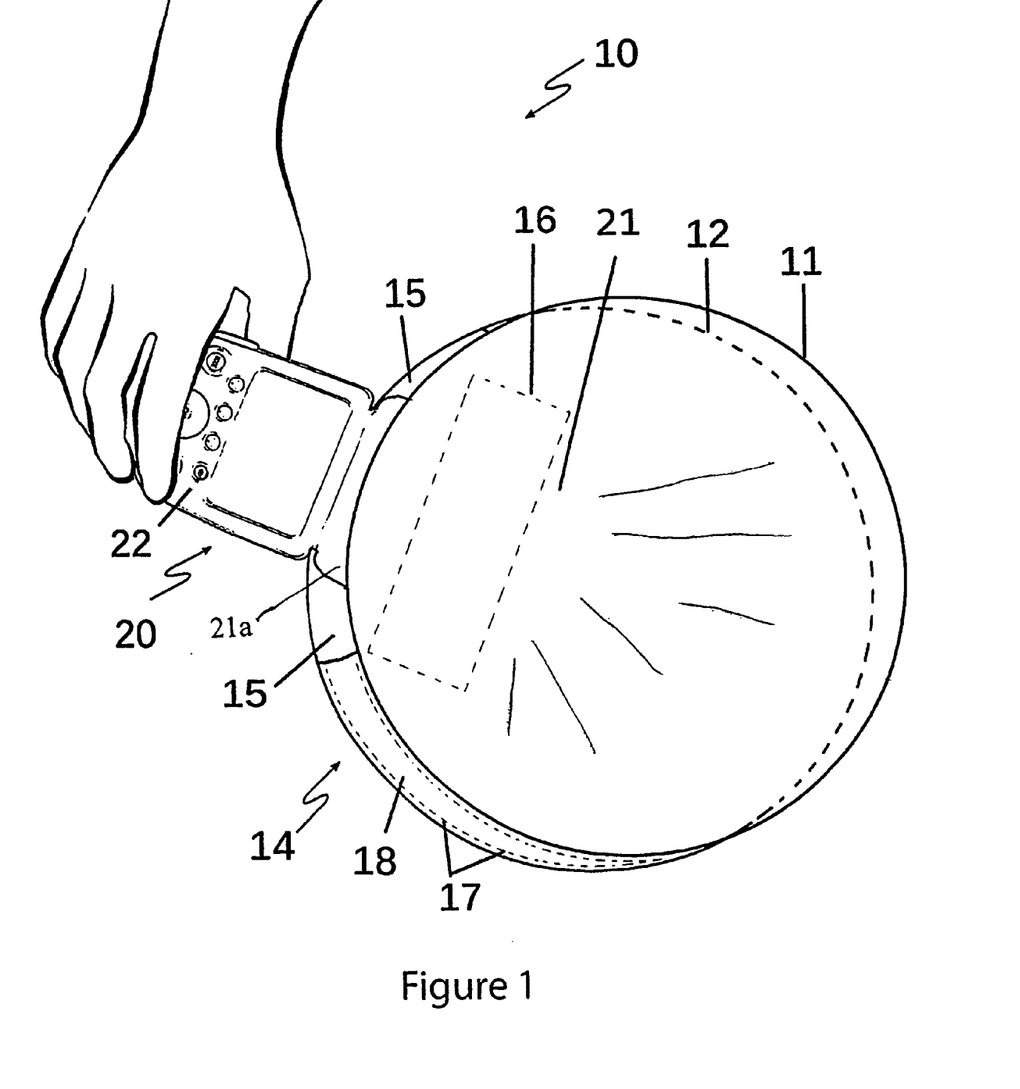
FIG. 1 shows a front perspective view of a light modifier device according to the present invention, shown in use with a flash.
Figure 2:
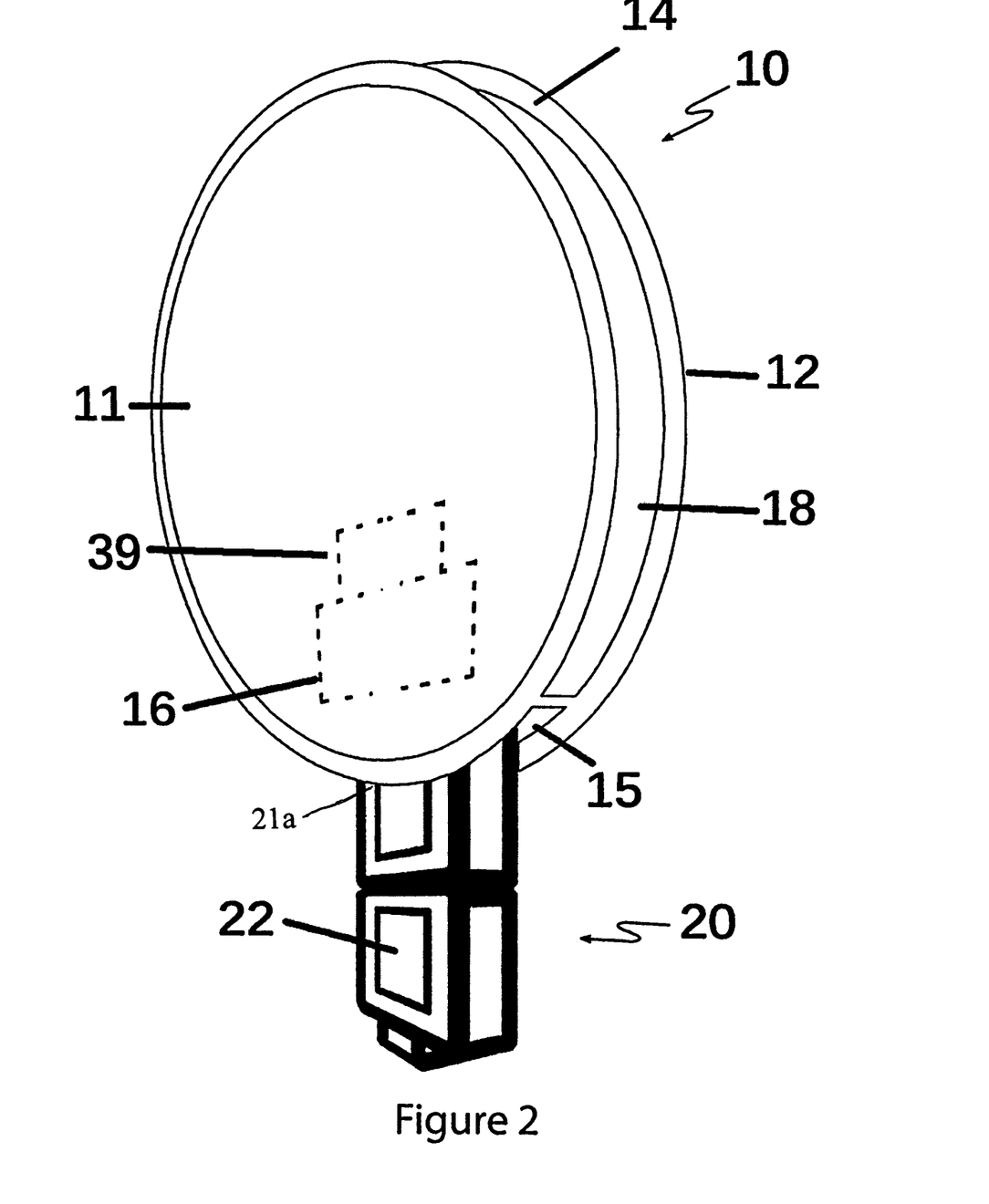
FIG. 2 is a front perspective view of a light modifier device according to the present invention, shown with a flash.
Figure 3:
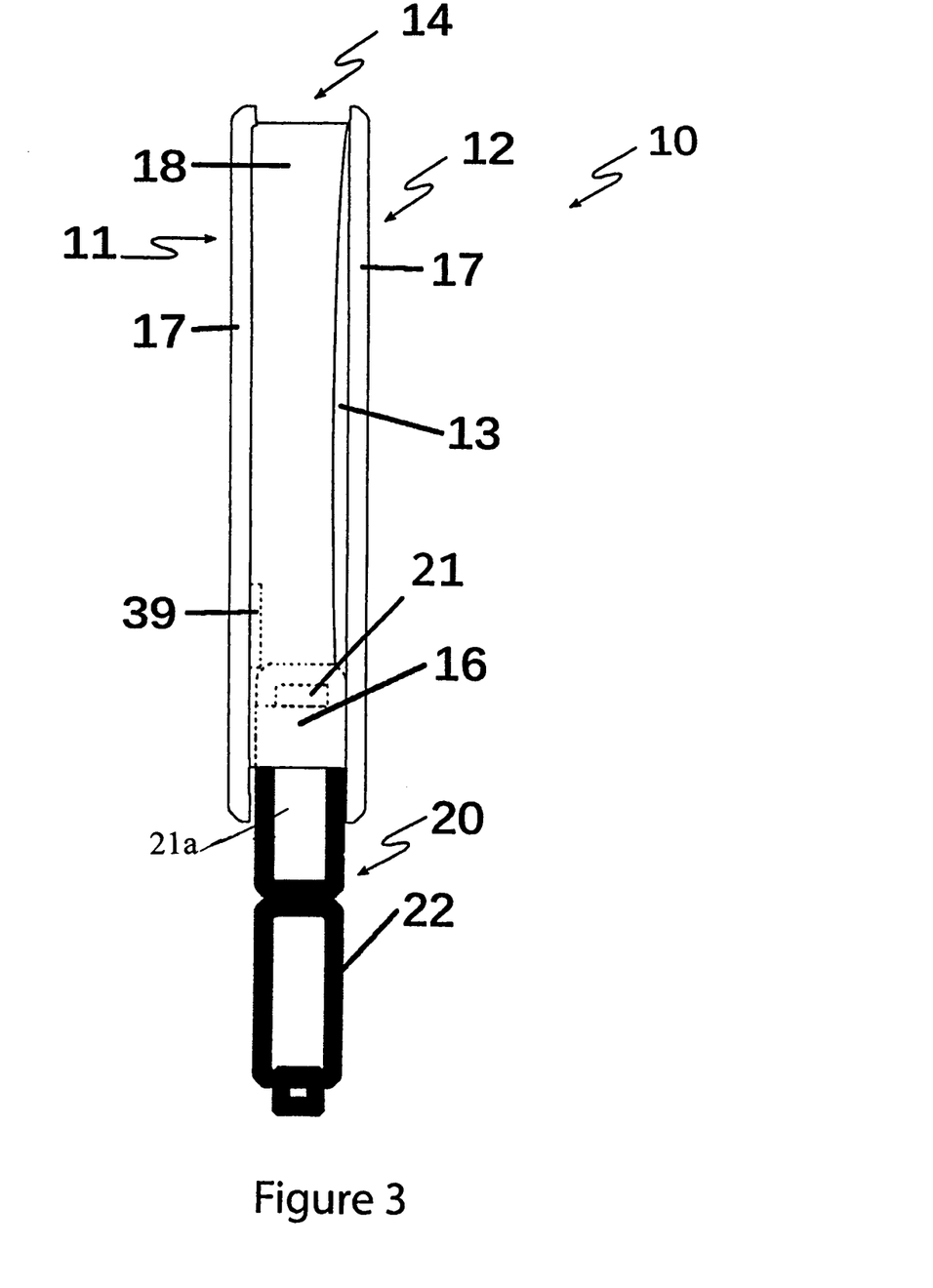
FIG. 3 is a side elevational view of the light modifier device according to FIG. 2.

The pop-up light modifier device 10 is shown in use in FIGS. 1-4 with a flash mechanism 20. In use, the head with the flash 21 of the flash mechanism 20 is turned up, inserted into the flash hole 15, and easily inserted behind the flash strap 16, which is preferably an elasticized strap (see FIG. 1). The elasticized strap 16 alone holds the lightweight light modifier device 10 in place on the flash mechanism 20. The photographer or other user holds the base 22 of the flash mechanism 20 with the light modifier device 10 on it down at an angle (about 45 degrees from a horizontal floor) as seen in FIG. 1, up as seen in FIG. 2, or in whatever direction the photographer or other user desires. The light modifier device 10 on the flash mechanism 20 can alternatively be clamped onto a light stand (not shown). It has been found that light from the flash 21 of the flash mechanism 20 in the light modifier device 10 shines up if the light modifier device 10 is held upright as seen in FIG. 2, or down if the user, holding the base 22 of the flash mechanism 20, points the light modifier device 10 at the ground. When the flash 21 goes off, a softened, even light is emitted through the translucent front panel 11.

Figure 4:
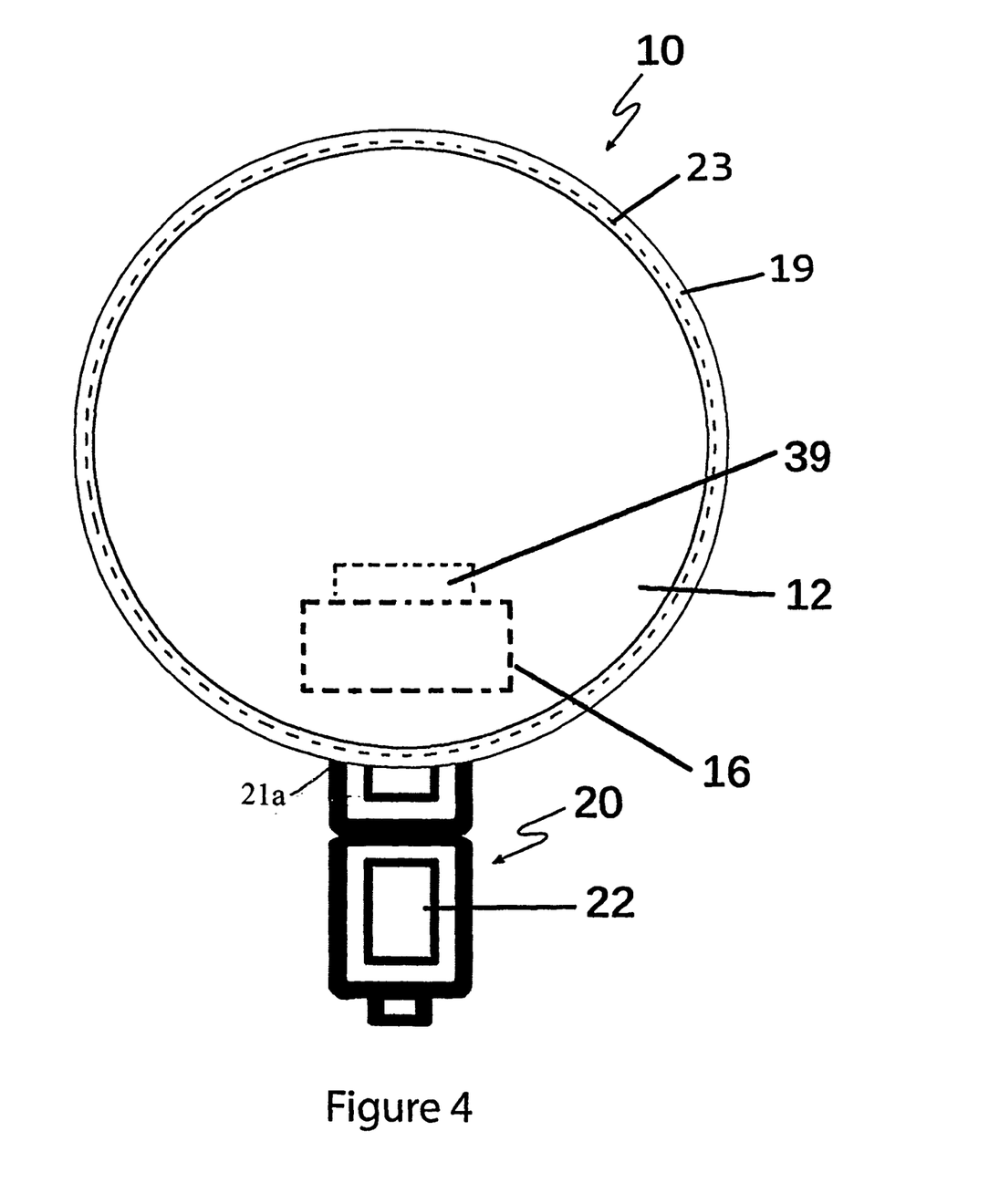
FIG. 4 is a rear elevational view of a light modifier device according to the present invention.

The translucent front panel 11 and the rear panel 12 are preferably same-sized. Each is shaped substantially like a relatively flat disc, with the bendable (moldable, flexible) wire frames 17 being substantially circular. The side panel 18 is preferably made of the same lightweight nylon, or other suitable fabric, as the front panel 11. The bendable wire frame 17 is attached around the periphery of the front nylon panel 11, and a same-sized bendable wire frame 17 is attached around the periphery of the rear nylon panel. A seam binding 19 preferably extends over the bendable wire frames 17. The binding 19 is stitched along its periphery through the panel material, as seen in FIG. 4 (stitching 23). In an alternate embodiment, the edges of the side panel 18 (rather than binding) overlap the bendable wire frame periphery of the front and rear panels 11, 12, and are sewn around the edges of the front and rear panels 11, 12 through the panel material. This soft box light modifier device 10 does not include hard parts that are likely to poke the user, or rust over time; the components of the light modifier 10 are basically soft.

The light modifier device 10 is foldable into a generally circular compact shape about one-half the size of the light modifier device 10 when it is open/in use. The folded, or closed, light modifier device 10 pops open when released from its compact shape. The folded light modifier device 10 has so much spring, in fact, that once it has been pulled out from the storage pouch a bit, it often pops out of the storage pouch 32 and away from the user's hand.

Even though it is lightweight, the light modifier device 10 is sturdy. This is a requirement because of the exposure to the elements at the many locations still photographers go to ply their trade (e.g., the beach, the mountains, sports venues, fairs).

The front and rear panels 11, 12 are both made of lightweight flag nylon or any suitable lightweight material. The side panel 18 extends between the front and rear panels 11, 12 and holds them together, permitting insertion of the flash 21 in the flash hole 15. The width of the side panel 18 is chosen to accommodate the thickness of most known camera flash mechanisms, and for beneficial effect in photographs taken using the light modifier device 10. The front panel 11 is translucent, so that a soft light is produced from the light modifier device 10 when the flash 21 goes off in the light modifier device 10.

The reflective inside surface 13 of the rear panel 12 is coated or covered with, or is, any white, silver, or any reflective material. The reflective material can be glued, painted, sprayed, etc. onto the inside surface of the rear panel 12. The side panel 18 preferably also includes a reflective inside surface 13. It is believed that the reflective material reflects light so that it bounces around inside the light modifier device 10 when the flash 21 goes off, and prevents light from escaping through the rear of the light modifier device 10.

By "pop up", or "pops open", herein is meant that the folded, compact light modifier device pops open as soon as it is released from storage in its pouch 32, band 37, etc., ready for immediate use. No unfolding is necessary. The word "pop-up" as used herein does not relate to the "pop up flash" mechanism built into many conventional digital cameras.

By "bendable wire frame" herein is meant a generally wire-shaped frame of any sturdy suitable material that bends but does not break under repeated, ordinary use (see figures herein).

The flash strap 16 is preferably an elasticized strap attached at its opposite ends to the reflective inside surface 13 of the rear panel 12. The elastic is inherently adjustable, so that many different shaped flashes, or "speed lights", can be accommodated. The flash hole 15 is wide enough to accommodate most known flashes. The ends of the elasticized strap 16 are preferably reinforced and stitched through the reflective inside surface of the rear panel 12, as seen in FIG. 6. The outside front of the front panel 11, an unattached side panel 18, and the inside surface of the rear panel 12 are shown in FIG. 6. The light modifier device 10 is so lightweight that only the flash strap 16 is needed to hold the light modifier device 10 in place on the flash mechanism 20. The flash strap 16 fits around the head 21a of the flash mechanism 20 just below the light. Once the light modifier device 10 has been strapped on the flash mechanism 20, the user need not hold the light modifier device 10, only the flash mechanism 20 (which can be temporarily affixed to a light stand).

A flash strap 16 with hook and loop material at each end may be used instead of the elasticized strap, but is less preferred. Once the flash head 21a of the flash mechanism 20 has been inserted in the flash hole 15, the opposite, hook and loop ends of the hook/loop flash strap are attached to one another over just below the flash 21.

As seen in FIG. 6, a strap tongue 29 is preferably attached along its upper edge to the lower edge of the elasticized strap 16 at the approximate center of the elasticized strap 16. The strap tongue 29 extends down into the flash hole 15, making it even easier to grasp the elasticized strap 16 and insert the flash head 21a behind the elasticized strap 16.

Figure 16:
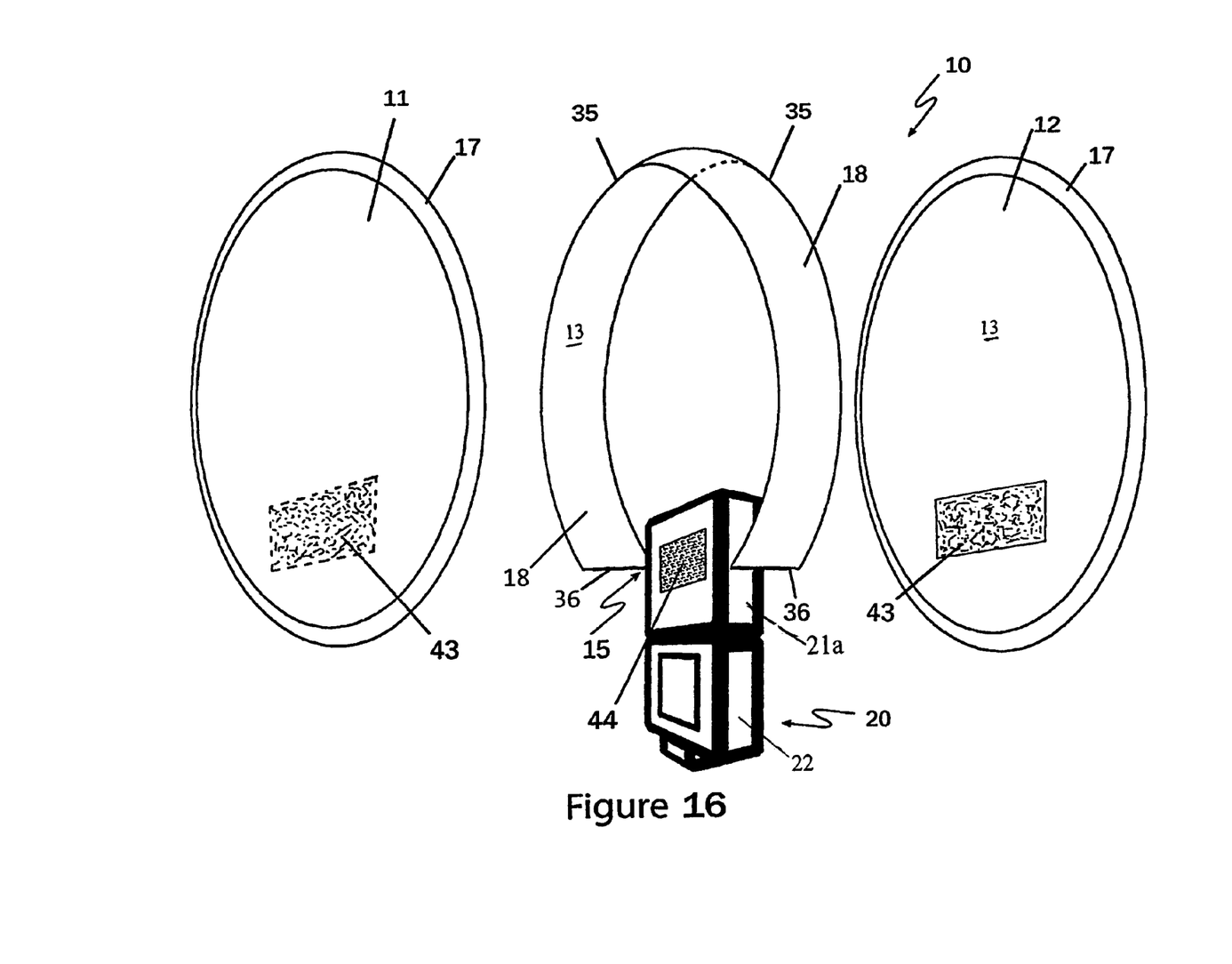
FIG. 16 is an exploded view of a light modifier device according to the present invention.

An alternate means of attaching the light modifier device 10 to the flash mechanism 20 is shown exploded in FIG. 16 for purposes of illustration. Here, two patches 43 of hook and loop material are attached to the front and rear panels 11, 12, respectively, at locations on the panels corresponding to one another. The back of each panel hook/loop patch 43 is attached to the inside surface of the rear or front panel 12, 11. The backs of two corresponding flash hook/loop patches 44 are attached to each longitudinal side of the upper segment (flash head 21a) of the flash mechanism 20 where the hook/loop patches 44 do not disrupt the flash. One flash hook/loop patch 44 is seen in FIG. 16. The hook/loop patch 44 on the opposite longitudinal side of the flash mechanism 20 has the same appearance as the hook/loop patch 44 seen in FIG. 16. The panel and flash hook/loop patches 43, 44 are preferably all the same size. Of course, if the panel hook/loop patch 43 is hook material, the corresponding hook/loop patch 43 on the flash mechanism 20 is loop material, and vice versa.

To use the light modifier device 10, the user inserts the flash head into the flash hole 15, pressing the hook/loop patch 44 on one longitudinal side of the flash mechanism 20 against the hook/loop patch 43 on the inside surface of the rear panel 12, and pressing the hook/loop patch 44 on the other longitudinal side of the flash mechanism 20 to the hook/loop patch 43 on the inside surface of the front panel 11. The flash from the flash mechanism 20 is not disrupted by the hook/loop patches 43, 44. Once they are detachably attached to one another, the hook/loop patches 43, 44 hold the lightweight light modifier device 10 in place on the flash mechanism 20. After use, the light modifier device 10 can easily be pulled away from the flash mechanism 20, and collapsed as described herein.

Figure 5:
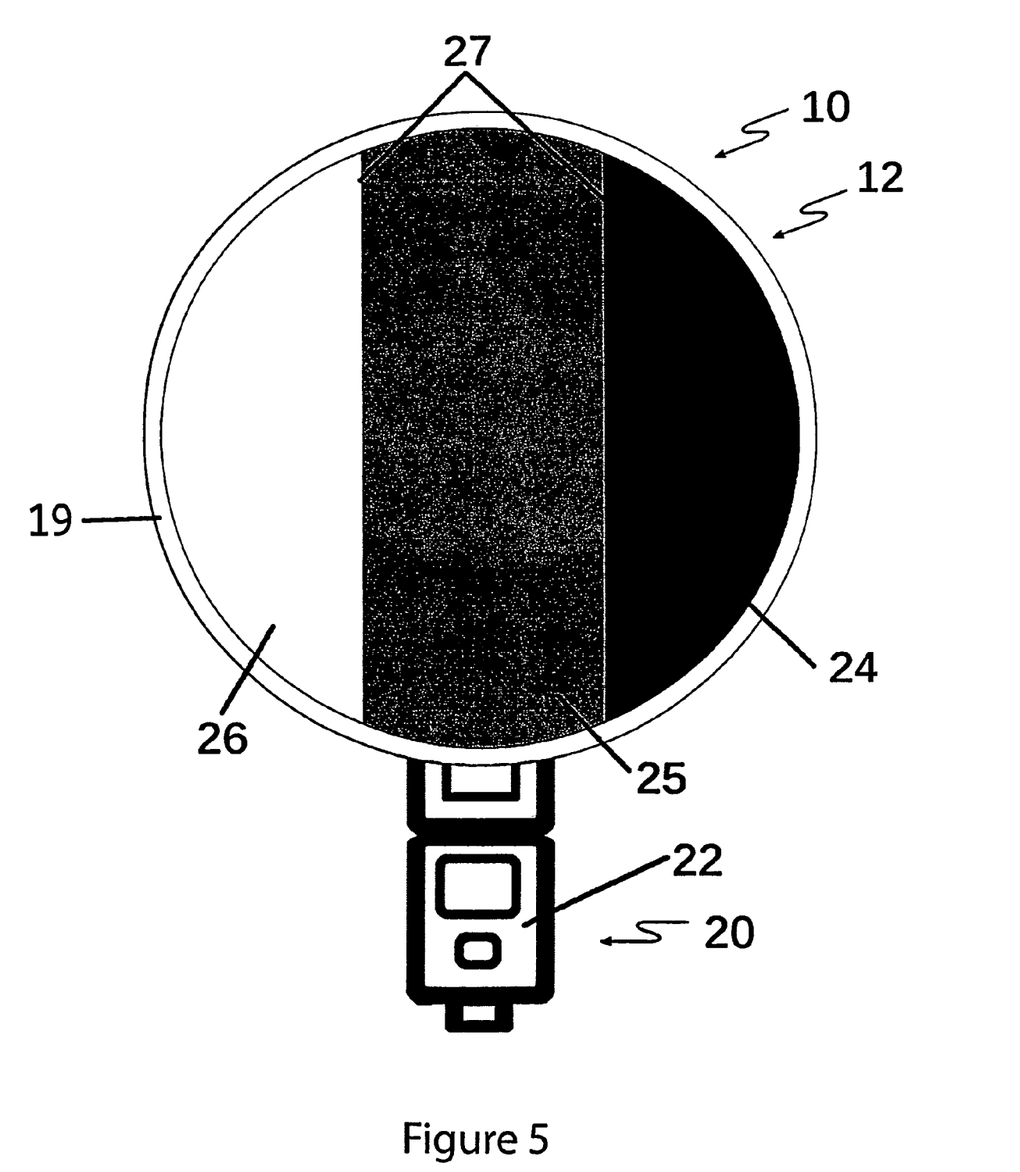
FIG. 5 is a rear elevational view of a light modifier device according to the present invention, showing a white balance calibration card on the outside of the rear panel of the light modifier device.

In addition to functioning as an effective light softener, the rear of the rear panel 12 of the light modifier device 10 preferably functions as a white balance calibration card 41. As seen in FIGS. 4, 5, 13, and 14, the rear surface of the rear panel 12 of the light modifier device 10 may be solid black or patterned. When it includes black, white, and gray, the rear surface provides a white balance photography aid. In that case, no separate white balance calibration card is needed, which saves the photographer time looking for one. Referring to the rear surface calibration card 41 of the rear panel 12 seen in FIG. 5, three vertical zones are provided: black 24, gray 25, and white 26. The right approximately ⅓ of the rear surface of the circular rear panel 12 of the light modifier device 10 shown in FIG. 5 is black card for metering exposure. The middle approximately ⅓ of the circular rear panel is 18% gray, which is not reflective. The left approximately ⅓ of the circular rear panel 12 of FIG. 5 is white for metering white balance. The rear panel 12 is not translucent, and light does not spill out the rear of the light modifier device 10. The two parallel lines 27 that delineate the two opposite sides of the gray zone 25 shown in FIG. 5 provide reference points. This has been found to work better for metering than an all-gray rear surface. The parallel lines provide an easy contrast for focusing.

In use, an initial, reference photo is taken of the rear surface calibration card 41 on the rear panel 12. Using a computer after the photo shoot, the black 24, gray 25, and white 26 zones provide a balance method for making the photographs from that photo shoot look true to life. The light modifier device 10 thus combines two products in one.

Figures 13, 14:
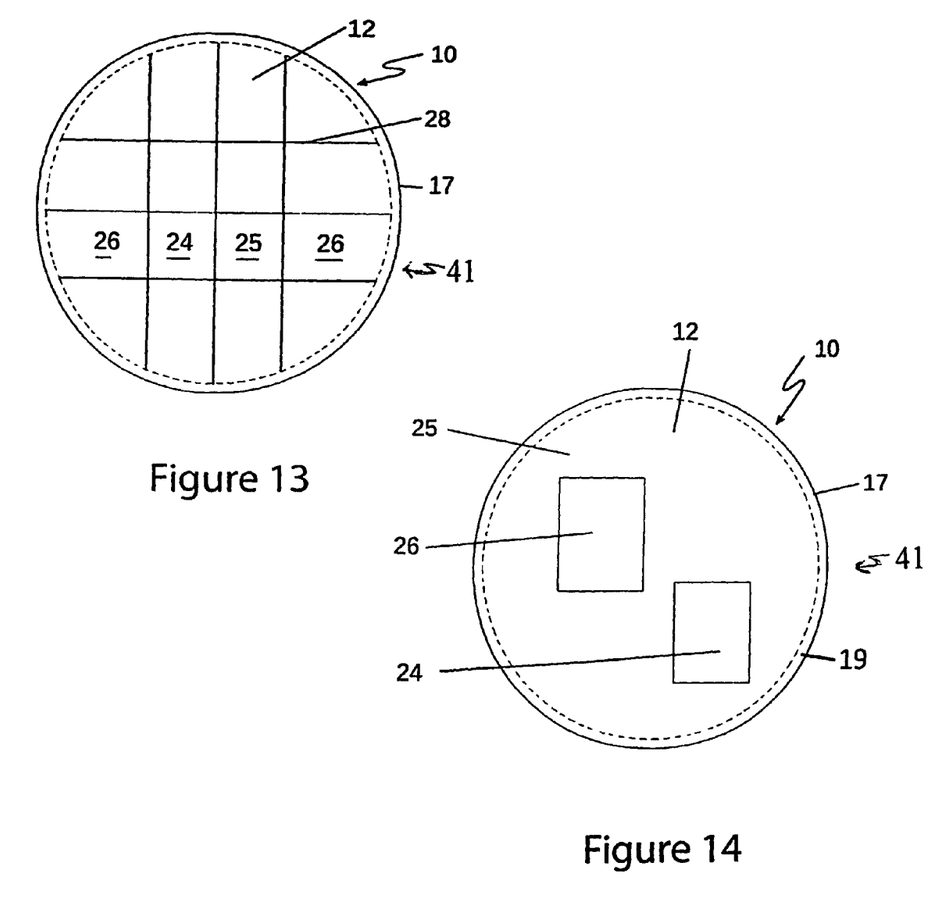
FIG. 13 is a rear elevational view of a light modifier device according to the present invention, showing a checkerboard calibration card.
FIG. 14 is a rear elevational view of a light modifier device according to the present invention, showing a 2-square calibration card.

The rear surface of the rear panel 12 alternatively includes a white balance calibration card 41 with a checkerboard pattern 28, as seen in FIG. 13. The checkerboard pattern has alternating, same-sized black 24, 18% gray 25, and white 26 squares. The edges of the squares along the periphery of the rear panel 12 are curved. The rear surface may alternatively be checked in a color card material having between about 2 and about 20 different colors.

The rear surface of the rear panel 12 includes suitable alternative patterns, such as a pure white square 26 and a pure black square 24 on a field of solid gray 25, as seen in FIG. 14. Each pattern can be used for balancing colors in that set of photos. The calibration card 41 on the rear panel 12 can be in the form of a company logos, with, for example, a gray background and letters (such as the first letters of the company name) in white and black, or a pure white logos on a pure black background with several letters in 18% gray.

The light modifier device 10 preferably includes a diffuser pad 39 in front of the flash's location when the flash 21 is in the light modifier device 10. The diffuser pad 39 allows additional light (that would otherwise be lost through the front panel) to bounce around inside the light modifier device 10. The diffuser pad 39 is made of any suitable, safe white or other reflective or light dampening material. The diffuser pad 39 is preferably a rectangle of the same white nylon material as the front panel on the inside surface of the front panel 11. The diffuser pad 39 is preferably roughly the same size as the flash strap 16. The diffuser pad 39 is preferably stitched around its edges to the front panel 11, as seen in FIGS. 2-4 and 6, just above the level of the flash strap 16, and adjacent the flash strap 16 on the inside surface of the rear panel 12. Instead of stitching, the diffuser pad 39 can be glued or heat transferred onto the inside surface of the front panel 11, or any other suitable method can be used for fixing the pad in place.

Figure 8:
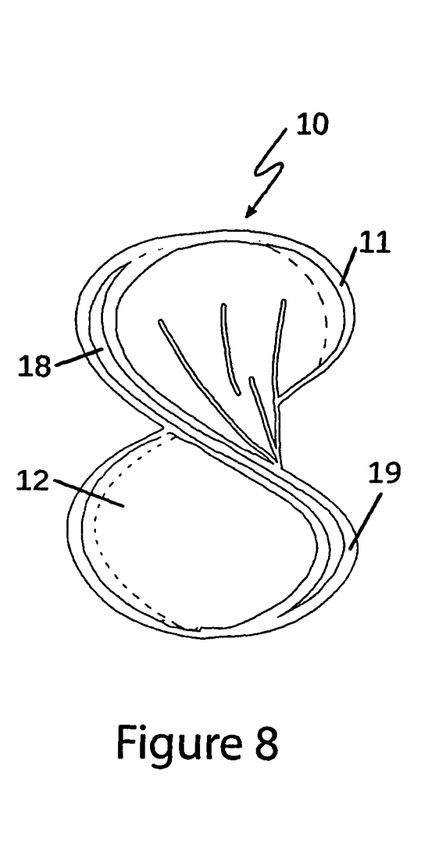

As shown in FIGS. 7-10, the light modifier device 10 is foldable into a compact version for storage. To fold the light modifier device 10, the user grasps the edges of the open light modifier device 10 at about 3:00 and 9:00 and brings the hands, thus the edges of the light modifier device 10, toward one another, which folds the light modifier device 10 like a taco in a twisting motion. The user then begins to twist his/her wrists toward one another, forming two or three similarly sized ring portions that lie on top of one another, as seen in FIG. 9. The user can alternatively use both hands to twist the light modifier device 10 into a figure eight shape as seen in FIG. 8. Continuing to hold the folded light modifier device 10 with one hand, the user pushes the folded device 10 into the pouch opening 33, as seen in FIG. 10. In the closed, collapsed position, the similarly sized ring portions are collapsed onto one another, forming two or three superimposed rings (see FIG. 9).

As illustrated in FIG. 10, the folded light modifier device 10 may be inserted into a similarly sized light modifier storage pouch 32. The storage pouch 32 is large enough for the compact, substantially cylindrical light modifier device 10 to fit closely into it, but not so large that the folded/collapsed light modifier device 10 pops open in the storage pouch 32. The storage pouch 32 conveniently fits into a pocket or purse, for example. The compactness of the collapsed light modifier device 10 is important for the busy photographer, who must carry a great many items with him or her while on the job. The storage pouch 32 is preferably made of the same lightweight material as the panels 11, 12. It preferably includes a zippered opening 33 that closely accommodates the folded light modifier device 10. The diameter of the folded light modifier device 10 is approximately one half or less than the diameter of the open, unfolded light modifier device 10. The pouch zipper 40 is closed once the folded light modifier device 10 has been inserted into the storage pouch 32. The storage pouch 32 preferably also includes a pouch loop 34 that can be looped over one's belt for carrying the light modifier device 10 out of the way at the waist.

When the photographer, videographer, assistant, or other user is at the photography site and has set up, the user opens the pouch zipper 40 and squeezes the bottom of the storage pouch 32, pushing up on the folded device 10 inside the pouch. Once the light modifier device 10 is part way out of the storage pouch 32, it will pop open. The user should be ready because, in popping open, the light modifier device 10 often springs a few feet away from the user. No complex opening process is required.

Figure 11:
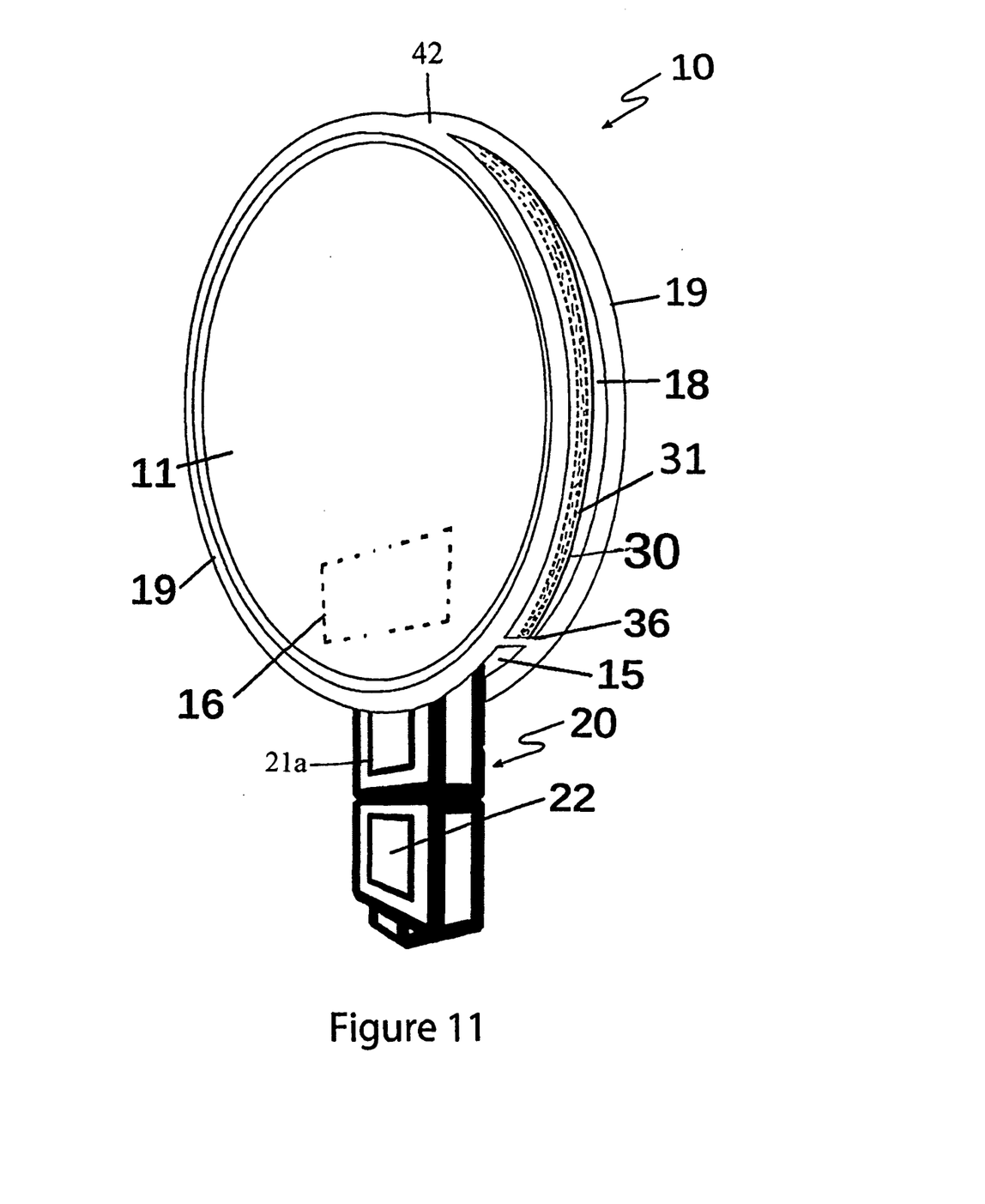
FIG. 11 is a front perspective view of a light modifier device according to the present invention, shown with a hook and loop side panel.
Figure 12:
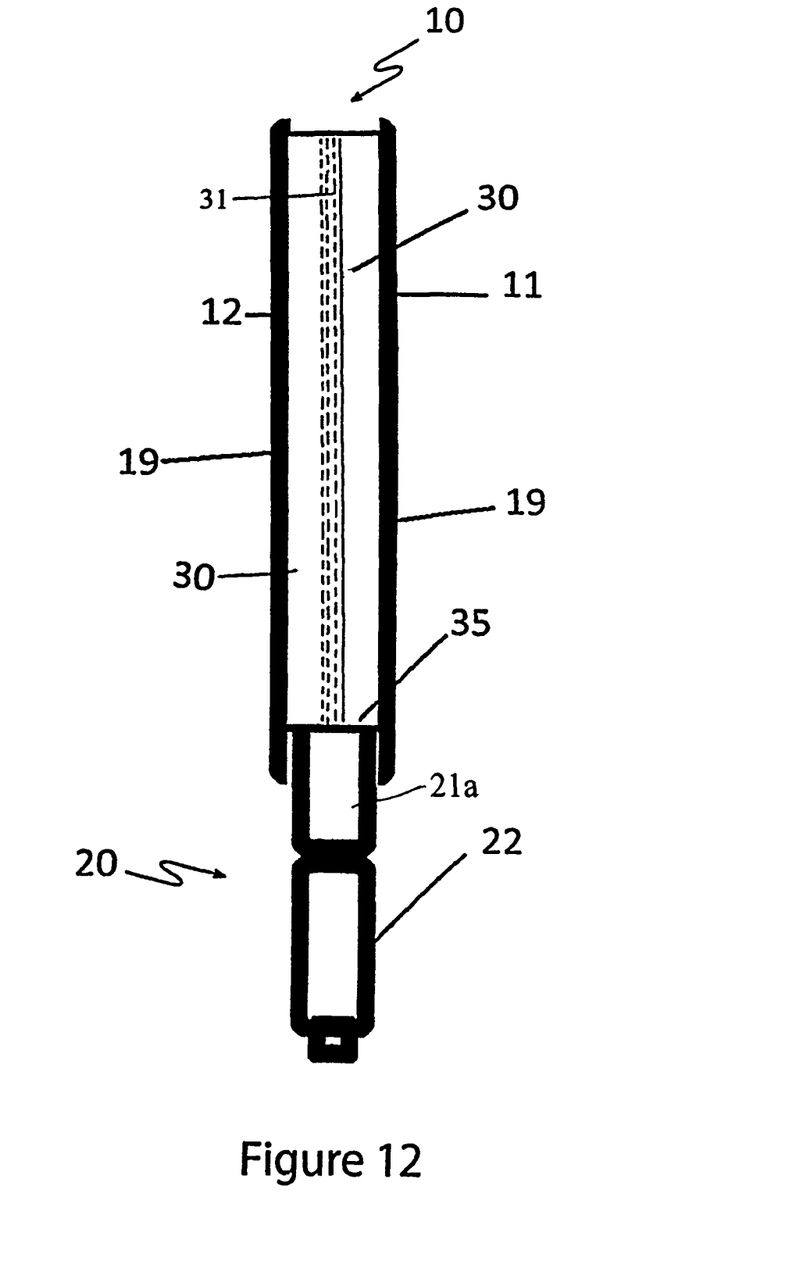
FIG. 12 is a side elevational view of the light modifier device according to FIG. 11.

As seen in FIGS. 11 and 12, the light modifier device 10 preferably comprises at least one, preferably two, side panels 18 comprising two opposite longitudinal edges 35. Each longitudinal edge 35 is attached to the front panel 11 or rear panel 12 adjacent a periphery of the front or rear panel. Each of the two side panels 18 is divided into two adjacent longitudinal side portions 30. Each side portion 30 includes a first or second hook and loop side strip 31 extends adjacent an inside edge of the side portion 30 (approximately at the center of the side panel 18), the first hook and loop side strip 31b corresponding to and substantially overlapping the second hook and loop strip 31a. As seen in FIG. 11, the side panels 18 do not extend to the top 42 of the light modifier device 10. The hook and loop side strips 31 are normally closed. By pulling the hook and loop side strips 31 open, the light modifier device 10 can be opened like a book, if necessary, the front and rear panels 11, 12 being like back and front book covers, the top 42 being akin to the book's spine.

Figure 15:
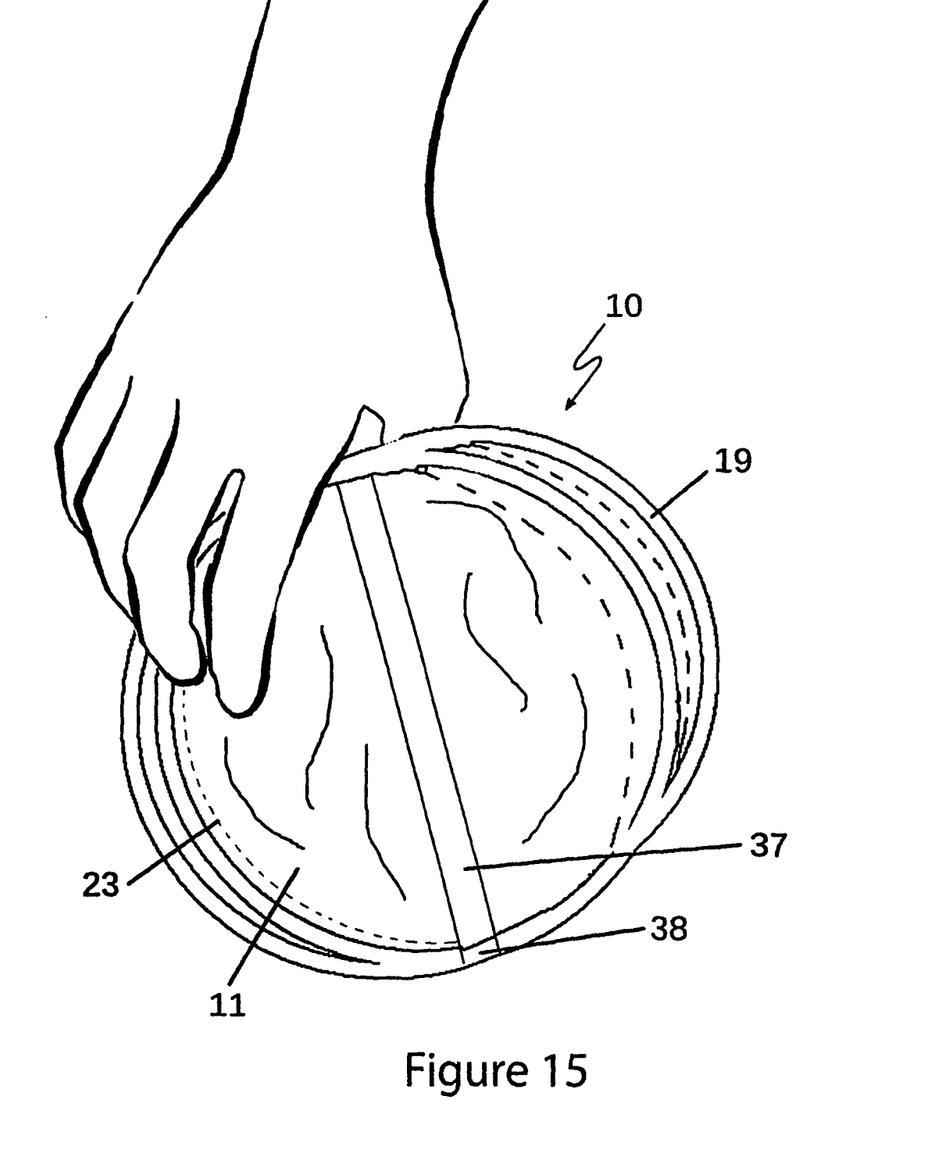
FIG. 15 is a perspective view of a folded light modifier device with an elasticized band according to the present invention.

As seen in FIG. 15, an elasticized band 37 attached at one section 38 to an edge of the light modifier device 10 can be used to tie the light modifier device 10 in place once it is folded, instead of using a storage pouch. The light modifier device 10 is twisted into the closed position and held with one hand while the elasticized band 37 is pulled across the diameter of the closed device 10 with the other hand. The lightweight light modifier device 10 is easy to hold in one hand; or in a pouch, purse, or pocket. If desired, a strap with hook and loop patches can be used instead of an elasticized band to the same effect. In that case, one end of the hook and loop strap is attached to an edge of the light modifier device 10 so the hook and loop strap is not lost. In use, the hook and loop strap is placed across the diameter of the folded light modifier device 10 and fastened using the hook and loop patches. As soon as the elasticized band 37, or the hook and loop patches, are released, the light modifier device 10 automatically pops-up into its open, ready position.

The open, generally cylindrical light modifier device 10 is preferably between about 6 and about 24 inches in diameter (and across the front and rear panels), and between about ⅛ inch and about 1.5 inches in width. The light modifier device 10 is more preferably between about 10 and about 14 inches in diameter (and across the front and rear panels), and about ¼ inch and about one inch in width, in order to channel a maximal amount of soft light up and out from the flash 21.

In the folded position, the generally cylindrical light modifier device 10 is preferably between about two and about 12 inches in diameter, more preferably between about four and about six inches in diameter, and between about one and about six inches wide, more preferably between about one and about three inches in width. The diameter of the folded light modifier device 10 is preferably less than half the diameter of the open, unfolded device 10.

Alternatively the light modifier device 10 may be substantially rectangular, or box-like, in shape, with rectangular-shaped front and rear panels and a side panel that is a relatively straight strip of fabric before it is attached to the front and rear panels. This differently shaped version of the light modifier device is also collapsible for storage in a pouch.

The light modifier device 10 is not intended for use as a backdrop. It is not used behind a subject at a photo shoot as background itself. To use the present light modifier device 10, the photographer or other user preferably holds the camera in his/her right hand, and the flash mechanism with the light modifier device 10 on it in the left hand. Alternatively, the flash mechanism can be locked onto a light stand in the desired position. The flash 21 fires when the camera takes a picture. The resulting diffuse light filtered through the light modifier device 10 lights the object being photographed, most often from the front and/or side. Several light modifier devices 10, each on a flash 21, can be used to light a shot, if desired.

No string or cord or other closure is required across the flash opening 15. The ends of the side panel 18 need not be tensioned in order to hold the light modifier device 10 on the flash 21. No additional cloth or covering is required to use the light modifier device 10. The light modifier device 10 is held on the flash mechanism 20 solely by the flash strap 16. A flash mechanism for use herein does not include a "pop-up flash".

One and only one hole in the light modifier device 10 is needed: the flash hole 15 at the base of the light modifier device 10 for admitting a flash head of a flash mechanism. Light from the flash 21 is reflected back from the sides of the light modifier device 10, too; the light modifier device 10 is not open on the sides. The light modifier device 10 in the open position is intended for detachable attachment to a flash mechanism, and not for use with a spotlight. The front and rear panels are not parabolic disc-shaped, or domed. The one-piece light modifier device 10 does not include any mechanisms for rotation, or any hinges or locking mechanisms. It is not umbrella-shaped, and does not include any poles, rods, struts, or ribs.

From the foregoing it can be realized that the described device of the present invention may be easily and conveniently utilized as a pop-up light modifier device for use in photography, videography, or the like. It is to be understood that any dimensions given herein are illustrative, and are not meant to be limiting.

While preferred embodiments of the invention have been described using specific terms, this description is for illustrative purposes only. It will be apparent to those of ordinary skill in the art that various modifications, substitutions, omissions, and changes may be made without departing from the spirit or scope of the invention, and that such are intended to be within the scope of the present invention as defined by the following claims. It is intended that the doctrine of equivalents be relied upon to determine the fair scope of these claims in connection with any other person's product which fall outside the literal wording of these claims, but which in reality do not materially depart from this invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

BRIEF LIST OF REFERENCE NUMBERS USED
IN THE DRAWINGS 10 light box device
11 translucent front panel
12 rear panel
13 reflective surface
14 bendable frame
15 flash hole
16 flash strap
17 bendable wire frame
18 side panel
19 binding
20 flash mechanism
21 flash
22 flash mechanism base
23 stitching on binding
24 black zone
25 gray zone
26 white zone
27 parallel lines
28 checkerboard
29 strap tongue
30 side panel portions
31 hook and loop side strips
32 storage pouch
33 pouch opening 34 pouch loop
35 side panel longitudinal edges
36 opposite ends of side panel
37 elasticized band
38 attached end of band
39 diffuser pad
40 pouch zipper
41 calibration card
42 top of light modifier device
43 panel hook/loop patches
44 flash hook/loop patches

What is claimed is:

1. A combination light modifier device and flash, the combination comprising a one-piece, collapsible light modifier device and a portable camera flash mechanism, the light modifier device comprising:
 (a) a translucent front panel comprising a bendable wire frame around its periphery;
 (b) a reflective rear panel comprising a reflective inside surface, the rear panel being substantially the same shape as the front panel, the rear panel comprising a bendable wire frame around its periphery;
 (c) at least one side panel between the front panel and the rear panel, adjacent a periphery of the front panel and a periphery of the rear panel, the side panel comprising a reflective inside surface;
 (d) a flash hole at a base of the light modifier device between opposite ends of the side panel, and between the front panel and the rear panel; and
 (e) an interior flash strap entirely within the light modifier device, the interior flash strap being attached at its opposite ends directly to the reflective inside surface of the rear panel adjacent the flash hole; wherein the light modifier device comprises a compact, closed position and an open position for use; the light modifier device in the open position detachably and substantially enclosing a flash head of the portable camera flash mechanism, a light exiting surface of the flash head directly faces the side panel, wherein the flash head is secured to the inside of the light modifier device by the flash strap.

2. The light modifier device and flash according to claim 1, wherein the light modifier device further comprises a compact, closed position from which it pops open to the open, ready for use position as soon as it is released from its compact, closed position; and wherein light from a fired flash from the turned-up flash head is reflected within the light modifier device by the inside surfaces of the side panel and the rear panel, and the resulting soft light is emitted through the translucent front panel.

3. The light modifier device and flash according to claim 1, wherein the front panel and the rear panel are each substantially disc-shaped, the bendable wire frames are each substantially circular in shape, and the at least one side panel extends between the peripheries of the two panels.

4. The light modifier device and flash according to claim 2, wherein the light modifier device in the closed position has a substantially cylindrical, compact shape; and wherein the turned-up flash head is aligned with a base portion of the flash mechanism, and the flash mechanism is a speed light.

5. The light modifier device and flash according to claim 3, wherein the at least one side panel comprises two opposite longitudinal edges, each longitudinal edge being attached to the front panel or rear panel adjacent a periphery of the front or rear panel; and wherein the flash strap provides the only support for the light modifier device on the flash mechanism, the light modifier device comprises only one hole, which is the flash hole, with no hole closure, and a portion of the flash mechanism extends through the flash hole.

6. The light modifier device and flash according to claim 5, wherein a fabric binding extends over the bendable wire frames, the binding being sewn to the respective front panel or rear panel, and the longitudinal edges of the side panel; and wherein the light modifier device does not comprise any struts.

7. The light modifier device and flash according to claim 1, wherein the flash strap is an elasticized strap, a base portion of the flash mechanism of the combination light modifier device and flash being hand-held, the light modifier device on the flash head being hands-free.

8. The light modifier device and flash according to claim 7, further comprising a strap tongue, the strap tongue being attached along its upper edge to a lower edge of the elasticized strap, the strap tongue extending down into the flash hole, the flash hole being sufficiently wide to accommodate the flash head.

9. The light modifier device and flash according to claim 1, further comprising a diffuser pad attached to the inside surface of the front panel opposite and substantially parallel to the flash strap, which is attached to the rear panel, the diffuser pad being substantially the size as the flash strap, the diffuser pad being positioned adjacent a flash of the flash mechanism.

10. The light modifier device and flash according to claim 1, comprising two of the at least one side panels, each of the two side panels being split into two adjacent longitudinal side portions, each side portion comprising a first or second hook and loop side strip extending adjacent an edge of the side portion, the first hook and loop side strip corresponding to and substantially overlapping the second hook and loop strip.

11. The light modifier device and flash according to claim 10, wherein the side panels are not split and are connected to one another at a top of the light modifier device opposite the flash hole.

12. The light modifier device and flash according to claim 1, wherein the light modifier device in a closed position comprises two or three similarly sized ring portions that are substantially superimposed on one another.

13. The light modifier device and flash according to claim 1, further comprising a white balance calibration card on an outside surface of the rear panel of the light modifier device.

14. The light modifier device and flash according to claim 13, wherein the calibration card of the rear panel comprises at least three vertical zones, the zones comprising a black zone, a gray zone, and a white zone.

15. The light modifier device and flash according to claim 1, further comprising a calibration card on an outside surface of the rear panel, the calibration card comprising a checkerboard pattern, the checkerboard pattern comprising a plurality of alternating, substantially same-sized black, gray, and white squares.

16. The light modifier device and flash according to claim 1, wherein a rear surface of the rear panel comprises a white balance calibration card comprising a solid gray background, at least one white square, and at least one black square.

17. A portable light modifier device and flash combination, comprising a camera flash mechanism and a collapsible light modifier device, the light modifier device comprising:
 (a) a translucent front panel comprising a bendable wire frame around its periphery; (b) a reflective rear panel comprising a reflective inside surface, the rear panel being substantially the same shape as the front panel, the rear panel comprising a bendable wire frame around its periphery; (c) at least one side panel comprising two opposite longitudinal edges, each longitudinal edge being attached to the front panel or rear panel adjacent a periphery of the front or rear panel; (d) a flash hole at a base of the light modifier device between opposite ends of the side panel, and between the front panel and the rear panel; and (e) at least two hook and loop patches, a rear surface of a first one of the hook and loop patches being attached to an inside surface of the front panel, a rear surface of a second one of the hook and loop patches being attached to an inside surface of the rear panel at a location corresponding to the location of the first hook and loop patch; wherein the light modifier device comprises a compact, closed position and a pop-up, open position ready for use; the light modifier device in the open position detachably and substantially enclosing a flash head of the camera flash mechanism; a light exiting surface of the flash head of the camera flash mechanism faces the side panel, wherein an emitted light from the flash head is incident upon the side panel and the rear panel, the light reflected by the inside surfaces of the side panel and the rear panel is transmitted through the front panel resulting in a soft light; the flash head comprises thereon another at least one hook and loop patch attached to one of the at least two hook and loop patches on the light modifier device, securing the flash head to the inside of the light modifier device.

18. The light modifier device and flash according to claim 17, wherein the flash head is aligned with a base portion of the flash mechanism, and the flash mechanism is a speed light.

19. The light modifier device and flash according to claim 17, further comprising a white balance calibration card on an outside surface of the rear panel of the light modifier device.

\* \* \* \* \*